United States Patent [19]

Shimizu et al.

[11] Patent Number: 4,930,096
[45] Date of Patent: May 29, 1990

[54] DATA-TRANSMITTING APPARATUS HAVING CONNECTING PLUG

[75] Inventors: Giichiro Shimizu; Misao Shimizu; Hajime Takeuchi; Toshiharu Okuyama; Yoshio Wakatuski, all of Tokyo, Japan

[73] Assignee: Man Design Co., Ltd., Tokyo, Japan

[21] Appl. No.: 348,175

[22] Filed: May 2, 1989

Related U.S. Application Data

[63] Continuation-in-part of Ser. No. 111,672, Oct. 23, 1987, abandoned.

[30] Foreign Application Priority Data

Jan. 22, 1987 [JP] Japan ................................ 62-12702
Feb. 6, 1987 [JP] Japan ................................ 62-24786

[51] Int. Cl.$^5$ .......................... G01B 7/18; G01B 7/30
[52] U.S. Cl. ...................................... 364/550; 33/784; 340/825.52; 364/560
[58] Field of Search ................. 33/504, 505, 140, 784; 364/474, 550, 552–564; 340/825.06, 825.07, 825.69, 825.17, 825.72, 825.49, 825.52, 825.53, 870.02; 455/95, 100, 115, 128

[56] References Cited

U.S. PATENT DOCUMENTS

| 4,118,871 | 10/1978 | Kirkham | 364/560 X |
| 4,257,107 | 3/1981 | Heymsfield et al. | 364/562 X |
| 4,334,221 | 6/1982 | Rosenhagen et al. | 340/825.72 |
| 4,586,150 | 4/1986 | Budziak et al. | 364/559 X |
| 4,642,899 | 2/1987 | Fass et al. | 33/140 |
| 4,677,755 | 7/1987 | Iwano et al. | 33/503 |
| 4,736,313 | 4/1988 | Nishimura et al. | 33/140 X |

FOREIGN PATENT DOCUMENTS

| 3129153A1 | 2/1983 | Fed. Rep. of Germany . |
| 3506306A1 | 9/1985 | Fed. Rep. of Germany . |
| 3511504A1 | 10/1986 | Fed. Rep. of Germany . |

Primary Examiner—Ulysses Weldon
Attorney, Agent, or Firm—Nixon & Vanderhye

[57] ABSTRACT

A caliper unit has a connector having connecting terminals. The caliper unit measures a value of a product, and generates digital data representing this value. A data-transmitting apparatus has a housing. The housing can be attached to caliper unit. The housing has a fastening ring and a connecting plug. The plug can be connected to the connector of the caliper unit by the fastening ring. A microcomputer including a CPU is provided within the housing. A RAM is also provided within the housing, for storing the digital data input from the caliper unit and also an identification (ID) number assigned to the data-transmitting apparatus. The microcomputer forms a serial-data message from the digital data and the ID number, both stored in the RAM. A transmitter is provided within the housing, for transmitting the serial-data message in the form of a radio message.

7 Claims, 5 Drawing Sheets

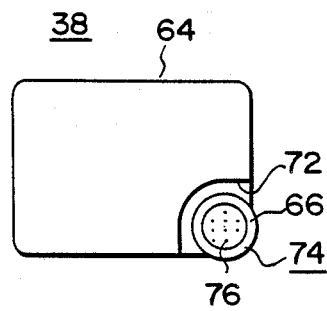
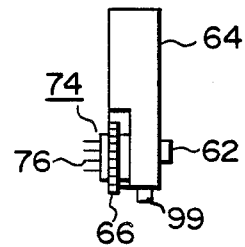
FIG. 5A      FIG. 5B
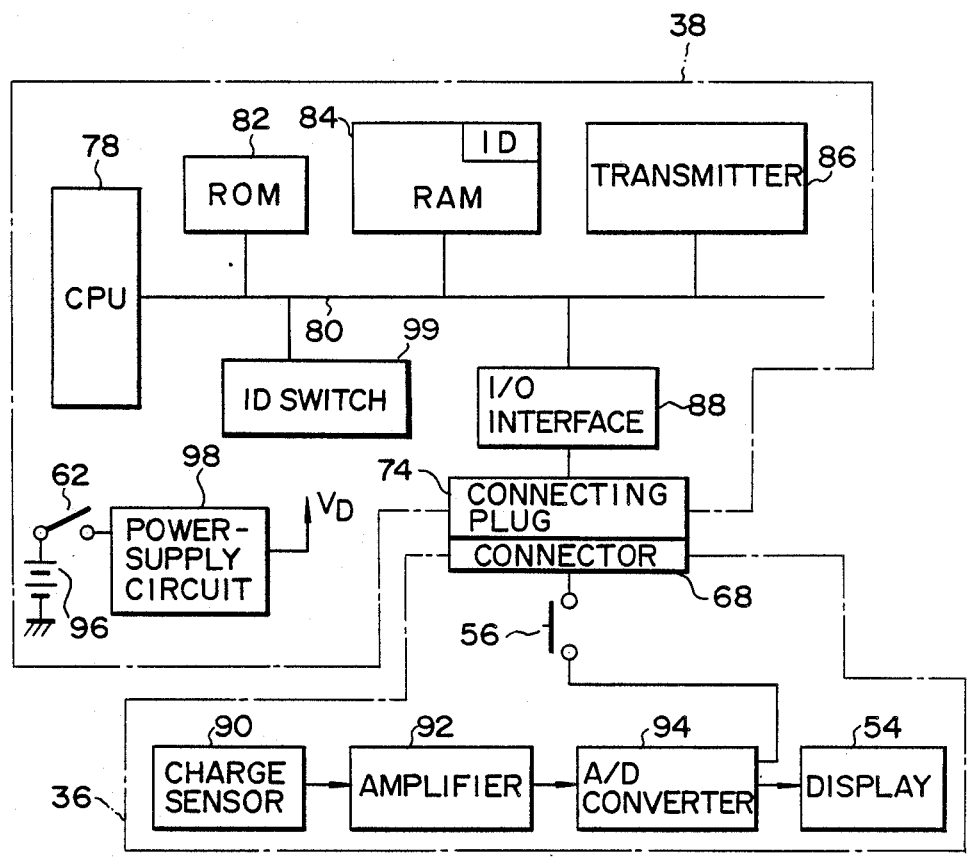
FIG. 6

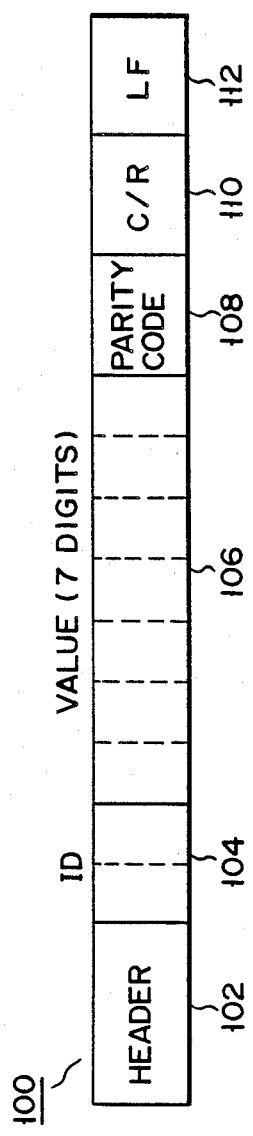
F I G. 7
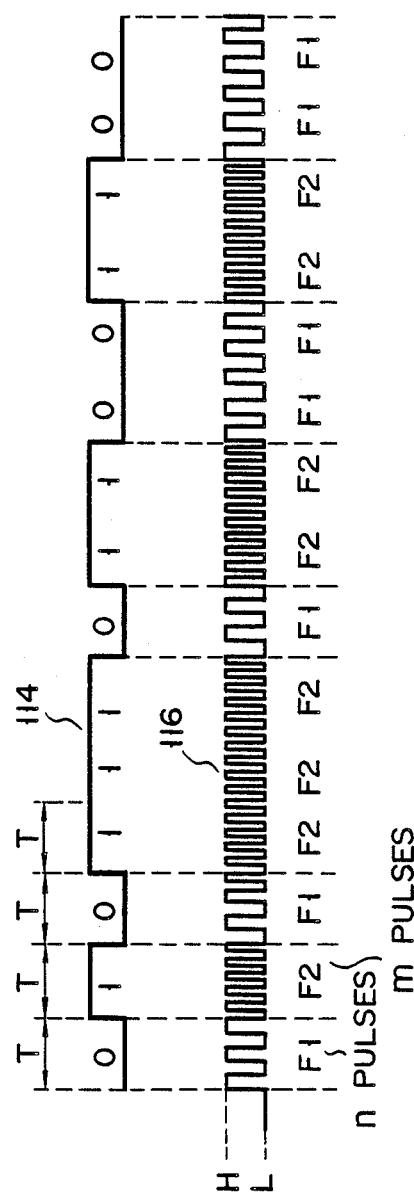
F I G. 8

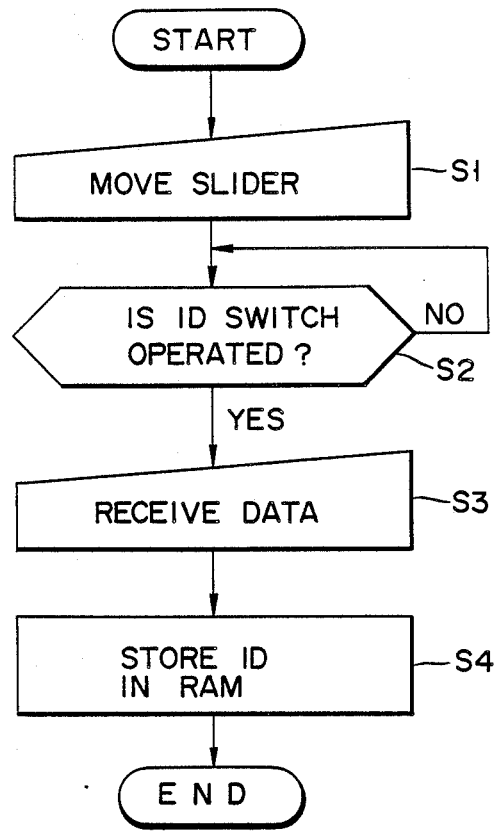
F I G. 9

DATA-TRANSMITTING APPARATUS HAVING CONNECTING PLUG

This is a continuation-in-part of application Ser. No. 111,672, filed Oct. 23, 1987, now abandoned.

BACKGROUND OF THE INVENTION

The present invention relates to a data-transmitting apparatus having a connecting plug, in which digital data representing various physical or chemical quantities measured by measuring devices is received through the connecting plug, and is transmitted to an external apparatus in the form of a radio message.

In a factory, products are subjected to various inspections. An inspection line is provided in the factory to inspect the products. Measuring devices of various types are arranged along the inspection line. As the products are moved in the inspection line, their physical or chemical quantities are measured by means of the measuring devices. Pieces of data representing the physical or chemical quantities measured by the devices are collected in a host apparatus. The data collected in the host apparatus is used to calculate the quality and yield of the products.

There are various kinds of inspection performed on the products. One of them is the size-measuring of products. When the products have a complicated shape, ten or more dimensional values must be measured of each product. One person may use vernier calipers to measure all these dimensional values. Usually, however, several persons use vernier calipers or similar measuring devices, each person measuring a few dimensional values. This method is preferred since the work efficiency is higher, and the error rate is lower, than when each person measures all dimensional values of the product. Hence, many measuring devices of the same type are required in most cases.

Data representing the values measured by the measuring devices supplied to, through cables, and is collected, in the host apparatus of a data collecting system. The data must be digital, or it cannot be processed in the host apparatus. Recently, a measuring device containing an analog-to-digital (A/D) converter has been put to practical use. The device measures a value of an article. The A/D converter converts the data representing this value to digital data. The digital data is transmitted via cables, from the device to the host apparatus. Since the data signals are digital, they are neither attenuated, nor degraded by noise. Hence, the reduction of the accuracy of the data can be minimized.

In the data collecting system, the measuring devices are connected by relays and cables to the host computer provided within the host apparatus. The cables, which connect the measuring devices to the relays coupled to the host computer, may hinder the persons using the devices in their work, particularly when the measuring devices are verniner calipers, micrometers, or the like. In short, the cables may reduce the work efficiency.

Further, the number of measuring devices which can be connected to one relay is limited. Hence, the more measuring devices, the more relays for supplying the items of data to the host computer. An increase in the number of relays no doubt results in an increase in the size and cost of the data collection system.

SUMMARY OF THE INVENTION

It is accordingly the object of the present invention to provide a data-transmitting apparatus having a connecting plug, which requires no cables in order to transmit data from measuring devices, which can therefore make it easy to use the measuring devices, and which is advantageous particularly when used in a data collecting system.

To accomplish this object, a data-transmitting apparatus having a connecting plug according to the invention comprises a housing which can be attached to a measuring apparatus having a connection terminal and capable of converting data representing a value measured of an article by means of the measuring apparatus, into digital data; a connecting plug provided on the housing and designed to be connected to the connecting terminal of the measuring apparatus; and a transmitter provided within the housing, for transmitting the data to an external apparatus in the form of a radio message.

BRIEF DESCRIPTION OF THE DRAWINGS

FIG. 5A is a front view of the data-transmitting apparatus having a connecting plug according to the present invention;

FIG. 5B is a side view of the data-transmitting apparatus shown in FIG. 5A;

FIG. 6 is a block diagram of the data-transmitting apparatus according to the present invention;

FIG. 7 is a diagram showing the format of a data message transmitted from the data-transmitting apparatus of this invention;

FIG. 8 is a timing chart representing the relationship between the data signals forming the data message and the frequency-modulated signal representing the data message; and FIG. 9 is a flow chart of exemplary program control steps for setting an ID number.

DETAILED DESCRIPTION OF THE PREFERRED EMBODIMENTS

Figure 1:
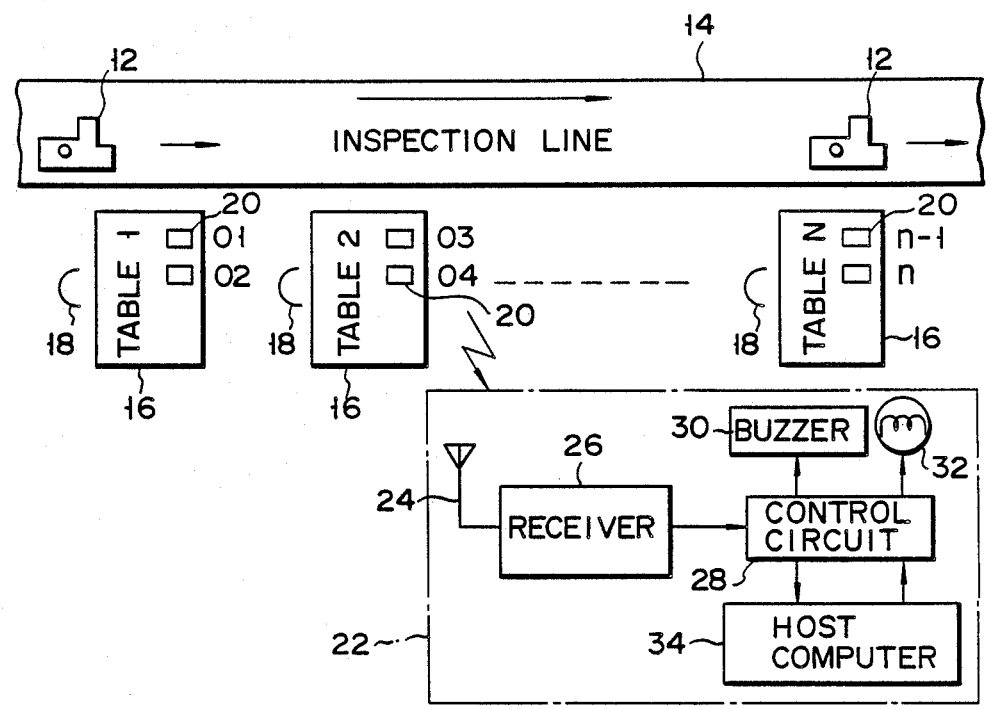
FIG. 1 is a diagram showing a data-collecting system, in which a data-transmitting apparatus of the invention is incorporated.
Figure 2:
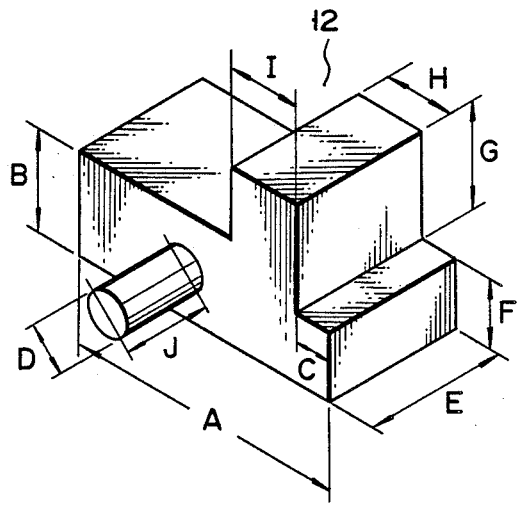
FIG. 2 is a perspective view of a product whose dimensional value can be transmitted by the data-transmitting apparatus of the invention.

FIG. 1 schematically illustrates a data collecting system provided with a data-transmitting apparatus, i.e., an embodiment of the present invention. The data collecting system is designed to collect the values measured of products 12 moving along inspection line 14 in the direction of arrows. Products 12 have such a shape as is shown in FIG. 2. Dimensional values A to J of each product 12 will be measured.

A plurality of tables 16 are provided along inspection line 14. Persons 18 stand at these tables 16, one person at one table. Some measuring devices 20 are placed on each table 16. Devices 20 are vernier calipers and the like. An identification (ID) number is assigned to each measuring device 20. The task of each person 18 is to use measuring devices 20 to measure only the dimensional value or values. Work robots may be used to manipulate devices 20, thereby to automatically measure values A to J of each product 12. As will be described later, in detail, each device 20 can transmit a data message containing the dimensional value measured of each product 12, in the form of a radio message.

Host apparatus 22 is provided which is remote from inspection line 14. Apparatus 22 comprises antenna 24, receiver 26, control circuit 28, buzzer 30, alarm lamp 32, and host computer 34. Antenna 24 catches the radio message output from any measuring device 20, and supplies the message to receiver 26. The message is supplied from receiver 26 via control circuit 28 to host computer 34. Host computer 34 determines whether or not the radio message contains an error. If an error is found in the message, control circuit 28 drives buzzer 30 and alarm lamp 32, thereby demonstrating the error. Host computer 34 can collect the dimensional values contained in the radio messages supplied to receivers 26, and can analyze these values.

Figures 3A, 3B:
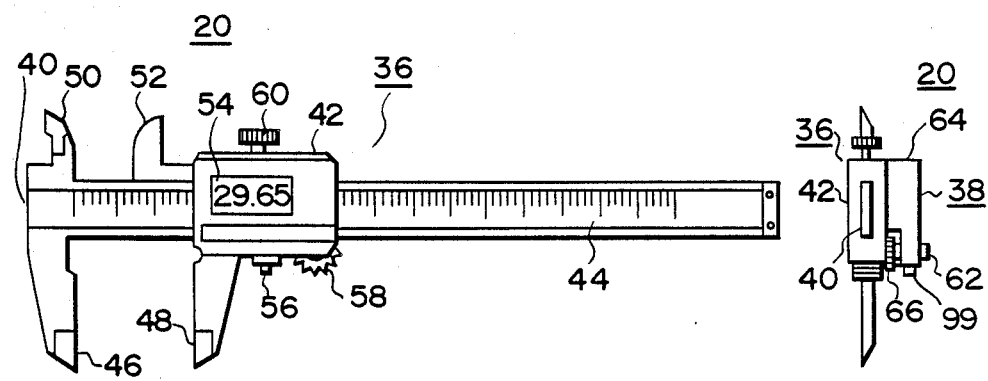
FIG. 3A is a front view of vernier calipers which can be used as a measuring device for measuring the dimensional values of the product shown in FIG. 2.
FIG. 3B is a side view of the verniner calipers shown in FIG. 3A.

FIGS. 3A and 3B show vernier calipers which can be used as measuring device 20 in the data collecting system described above. As is shown in these figures, vernier calipers are comprised of caliper unit 36 and data-transmitting apparatus 38. Caliper unit 36 includes main scale 40 and slider 42 having display 54. Data-transmitting apparatus 38 is attached to the back of slider 42, and comprises several components as will be described later.

Main scale 40 of caliper unit 36 has graduated plate 44. A capacitor strip is embedded within this graduated plate 44. An electrode is attached to the inner surface of slider 42, and slides on the capacitor strip when slider 42 is moved in sliding contact with main scale 40. Hence, as slider 42 is moved, the capacitance delivered from this electrode changes. The changes of this capacitance can be converted into the distance between jaws 46 and 48 fixed to main scale 40 and slider 42, respectively, or into the distance between bills 50 and 52 secured to main scale 40 and slider 42, respectively. This distance, i.e., a dimensional value measured by vernier calipers, is displayed by display 54 which is a liquid-crystal display.

As is shown in FIGS. 3A, transmission button 56 is provided on the finger rest 58 of slider 42, and screw 60 is engaged in a screw hole cut in slider 42.

As is shown in FIG. 3B, power-supply switch 62 is attached to the back of housing 64 of data-transmitting apparatus 38. Ring 66 for fastening a connecting plug (not shown) of apparatus 38 to a connector (not shown) of slider 42 is provided at the lower portion of housing 64.

Figure 4:
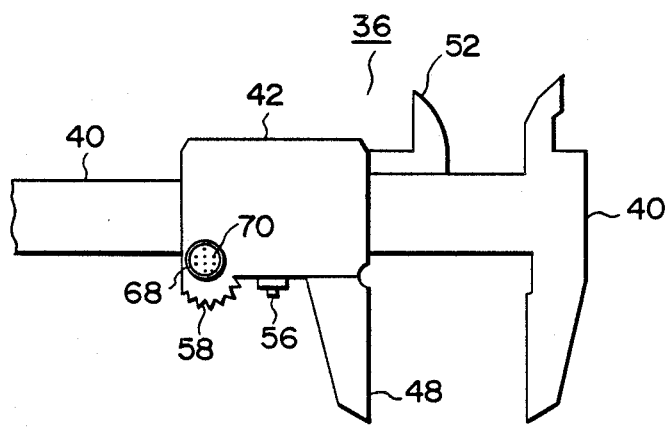
FIG. 4 is a rear view of a caliper unit of the vernier calipers shown in FIG. 3A.

FIG. 4 is a rear view of vernier calipers 20 with apparatus 38 removed from it. Connector 68 is fastened to the lower portion of slider 42. Connector 68 has nine connecting terminals 70 which are to be coupled to eight signal lines and one grounding line in order to transmit an 8-bit data from caliper unit 36. A female screw is cut in the inner periphery of connector 68. Ring 66 can be in a screw engagement with connector 68.

FIGS. 5A and 5B are a front view and a side view of data-transmitting apparatus 38. As is shown in these figures, housing 64 has stepped portion 72 in the front surface. Tubular connecting plug 74 is provided on stepped portion 72; plug 74 can be connected to connector 68.

In order to connect data-transmitting apparatus 38 to slider 42, housing 64 and slider 42 are put together, with the front of the former set in contact with the back of the latter. Plug 74 has nine pins 76. These pins 76 are inserted into the holes of connecting terminals 70 of connector 68 when housing 64 is pressed onto the back of slider 42. To secure housing 64 to slider 42, ring 66 is rotated, thereby bringing ring 66 into screw engagement with connector 68. When ring 66 is firmly engaged with connector 68, apparatus 38 is strongly attached to slider 42.

FIG. 6 is a block diagram showing caliper unit 36 and data-transmitting apparatus 38. Data-transmitting apparatus 38 comprises CPU 78 of a microcomputer for performing various operation on the data input from caliper unit 36. Apparatus 38 further comprises bus line 80, ROM 82, RAM 84, transmitter 86, and input/output (I/0) interface 88. ROM 82, RAM 84, transmitter 86, and I/0 interface 88 are connected to CPU 78 by bus line 80. ROM 82 stores a control program and the like. RAM 84 can temporarily store the ID number of apparatus 38 and the value measured by means of vernier calipers 20. Transmitter 86 is used to transmit a data message containing the value and the ID number, in the form of a radio message. I/0 interface 88 can receiver data from caliper unit 36.

As is also shown in FIG. 6, caliper unit 36 comprises charge sensor 90, amplifier 92, analog-to-digital (A/D) converter 94, and display 54. Charge sensor 90 is made of the capacitor strip embedded in graduated plate 44, and the electrode attached to the inner surface of slider 42. Sensor 90 can output a voltage signal representing the dimensional value amplify the voltage signal output from charge sensor 90. A/D converter 94 is used to convert the amplified voltage signal, which is an analog signal, into a digital value. Display 54 can display this digital value. The digital value can be supplied from A/D converter 94 to I/0 interface 88 through connector 68 and connecting plug 74 when transmission button 56 is pushed.

The gain of amplifier 92 is adjusted such that the digital value obtained by A/D converter 94 accurately represents the dimensional value actually measured by means of vernier calipers 20. Further, it is subjected to zero-point adjustment, for the same purpose. In this embodiment, display 54 can display the dimensional value in six digits at most, as an effective value.

As is shown in FIG. 6, battery 96 is provided within housing 64. Drive voltage $V_D$ can be applied from this battery to the electronic components of apparatus 38 through power-supply switch 62 and power-supply circuit 98.

The operation of data-transmitting apparatus 38 will be explained. First, person 18 attached apparatus 38 to caliper unit 36, thereby connecting plug 74 to connector 68 of caliper unit 36. Then, person 18 turns on power-supply switched 62. He or she operates a dip-switch (not shown) provided in caliper unit 36, thus writing the ID number of apparatus 38 into RAM 84. RAM 84 keeps storing this ID number until power-supply switch 62 is turned off, or unless person 18 operates the dip-switch to change the ID number to a different one.

An explanation will be given below of an exemplary method of setting the aforementioned ID number. It is already known in the art that DIP switch 60 is a known type which permits one to set a plurality of signal (digital bit) patterns. Let it be assumed that the ID number is set. If a signal pattern is set to a proper digit number by means of DIP switch 60, it is stored as an ID number as it is when the operation of the respective digit switch has been completed.

Another way of setting another ID number will be explained below with reference to the flow chart shown in FIG. 9. According to this method, any arbitrary or any predetermined numeral value is displayed on digital display 54 by moving slider 42 of a digital vernier's caliper (step S1). Now assume that some digits of a "digital display" numeral, for example, the upper two digits from "01" to "99", are initially set as the ID number on the caliper to which 99 or below are assigned as available digits. After the ID number is set by a two-digit numeral corresponding to the ID number, Id switch 99 shown in FIGS. 3B, 5B and 6 is operated (step S2). In response to the operation signal, in data transmitting apparatus 38 with a connection plug, CPU 78 reads the numerals in two digits as an ID number through I/O interface 88 (step S3) and allows the ID number to be stored in RAM 84 (step S4). The ID number is therefore set.

Thereafter, person 18 measures one dimensional value of product 12 placed on table 16 by using each vernier calipers 20. More specifically, he or she inserts product 12 into the gap between jaws 46 and 48, and then moves slider 42 until jaw 48 of slider 42 and jaw 46 of main scaler 40 pinch product 12. While slider 42 is being moved, the value displayed by display 54 changes. When product 12 is correctly pinched between jaws 46 and 48, person 18 pushes transmission button 56. As a result, the 8-bit data representing the measured value is supplied from caliper unit 36 to I/O interface 88 of data-transmitting apparatus 38.

In data-transmitting apparatus 38, CPU 78 reads the 8-bit data as correct digital data, and writes this data into RAM 84. Further, CPU 78 forms data message 100 schematically shown in FIG. 7, which contains the 8-bit data and the ID number.

As is shown in FIG. 7, data message 100 is formed of header 102, 2-digit ID number 104, 7-digit measured value 106, parity code 108, carriage-return (C/R) code 110, and line-feed (LF) code 112. Header 102 is a prescribed code representing that message 100 contains the value measured by verniner calipers 20. One digit of 7-digit measured value 106 may contain a decimal point. Parity code 108 is used to check an error made in transmitting the message from transmitter 86 to host apparatus 22. C/R code 110 indicates that message 100 is a complete one.

CPU 78 supplies data message 100 thus formed, to transmitter 86. Transmitter 86 frequency-modulates digital data message 100, and then transmits message 100 to host apparatus 22. Person 18, who holds vernier calipers 20, functions as a transmitting antenna.

FIG. 8 is a timing chart illustrating the relationship between the digital data signals forming message 100, on the one hand, and the frequency-modulated signals output from transmitter 86. As may be understood from FIG. 8, any digital data signal 114 at "0" level is converted to frequency-modulated signal 116 of low frequency F1, whereas any digital data signal 114 at "1" level is changed to frequency-modulated signal 116 of high frequency F2. More precisely, each digital data signal 114 at "0" level (or the low level) is changed to signal 116 including n pulses, whereas each digital data signal 114 at "1" (or the high level) is changed to signal 116 including m pulses, where n is less than m.

Data message 100, thus frequency-modulated, is transmitted from transmitter 86. The antenna 24 of host apparatus 22 receivers this message 100. Message 100 is supplied to receiver 26 of host apparatus 22. Receiver 26 demodulates data message 100, thus providing a digital data message. The digital data message is supplied from receiver 26 via control circuit 28 to host computer 34.

Host computer 34 checks parity code 108 contained in data message 100, thereby determining whether or not an error has occurred in transmitting message 100 from transmitter 86 to antenna 24. If an error has occurred, host computer 34 supplies control circuit 28 with a signal showing this fact. In this case, control circuit 28 operates buzzer 30 and alarm lamp 32, thus demonstrating the transmission error. Hearing buzzer 30 making alarm sound, and seeing lamp 32 emitting light, person 18 understands that the measured value has not been correctly transmitted to host apparatus 22. He or she, therefore, uses verniner calipers 20 again, in order to measure the dimensional value of product 12.

Host computer 34 contains programmed data showing the order in which dimensional values A to J should be measured of each product 12 at table 16, programmed data representing the ID numbers of data-transmitting apparatuses 38 attached to measuring devices 20 used for measuring values A to J, and programmed data showing the tolerances for these values A to J. Host computer 34 checks data message 100 transmitted from each data-transmitting apparatus 38, in comparison with these items of programmed data. Therefore, when person 18 working at any table 16 measures a dimensional value other than the specific one which he or she should measure, or when dimensional values A to J are measured in a wrong order, or when a wrong measuring device is used, host computer 34 determines that an error has been made curing the inspection of product 12. Then, control circuit 28 operates buzzer 30 and alarm lamp 32, whereby an alarm is given to demonstrate this error.

When host computer 34 determines that no errors have been made, it records data message 100 on a recording medium. In other words, computer 34 collects dimensional values A to J contained in messages 100, which have been correctly transmitted from measuring devices 20 to host computer 22. Host computer 34 analyzers the collected values, A to J, thereby determining whether or not product 12 is above a prescribed quality level, and processes values A to J measured of many products 12, thus calculating the average quality level of these products and also the yield thereof.

Since values A to J measured of each product 12 are transmitted from data-transmitting apparatus 38 to host apparatus 22, in the form of a radio message, no cables must be used to connect measuring devices 20 to host apparatus 22. Therefore, devices 20 can be mainpulated more easily than otherwise. Data-transmitting apparatus 38 can increase the work efficiency. In addition, since not cables and no relays are required, the data collecting system can be small.

Further, the microcomputer, which is the main component of data-transmitting apparatus 38, can be a signal semiconductor element (i.e., a one-chip microcomputer). Hence, the microcomputer, connecting plug 74, transmitter 86, battery 96, and the like, can be provided within housing 64 which is as small as slider 42 of caliper unit 36. In other words, data-transmitting apparatus 38 of the present invention can be as small as slider 42.

The operability of a measuring device such as vernier calipers will not be reduced when apparatus 38 is attached to the measuring device.

Connecting plug 74 of data-transmitting apparatus 38 can easily be connected to connector 68 of measuring device 20. Therefore, apparatus 38 can be attached to various types of measuring devices 20 (e.g., verniner calipers, a micrometer, etc.) to transmit values measured by means of these devices 20. Data-transmitting apparatus 38 can, thus, be used very efficiently.

Ring 66 can fasten connecting plug 74 to connector 68, through it is simple in structure. No other fastening mechanisms need not be used to attach housing 64 to the back of slider 42 of caliper unit 36.

What is claimed is:

1. A data-transmitting apparatus which is connectable to digital output terminal of a digital measuring means for outputting a digital measured value, said digital measuring means including said digital output terminal, said data transmitting apparatus comprising:
   housing means detachably mounted to the digital measuring means;
   connecting plug means provided on said housing means for connecting with the digital measuring means digital output terminal and for receiving digital data output from the digital output terminal of the digital measuring means;
   ID number setting means for storing at least one digit of desired digital data supplied from the digital measuring means through the connecting plug means as an ID number for identifying the data-transmitting apparatus;
   microcomputer means provided with said housing means and coupled to said ID number setting means, for generating a serial measured data message including the digital data supplied from the digital measuring means through the connecting plug means as a measured result of the digital measuring means; and
   data transmitter means provided within said housing means and connected to said microcomputer means, for modulating an RF carrier signal with the serial measured data message formed in said microcomputer means and for radiating said modulated RF carrier signal to an external apparatus in the form of a radio message.

2. A data-transmitting apparatus according to claim 1, wherein said ID number setting means includes reading means for reading one of a one digit numeral and a two digit numeral of digital data supplied from the digital measuring apparatus through said connecting plug, and storing means for storing the numeral read by said reading means as an ID number.

3. A data-transmitting apparatus according to claim 2, wherein said data transmitter means includes a switching means connected to said reading means responsive to digital data output from the digital measuring means for causing said reading means to perform the reading operation.

4. A data-transmitting apparatus according to claim 1, wherein said ID number setting means includes reading means for reading at least the upper one-digit numeral corresponding to the digital data supplied from the digital measuring apparatus through said connecting plug, and storing means for storing the numeral read by said reading means as the ID number.

5. A data-transmitting apparatus which is connectable to digital output terminal of a digital measuring means for outputting a digital measured value, said digital measuring means including said digital output terminal, said data transmitting apparatus comprising:
   housing means detachably mounted to the digital measuring means;
   connecting plug means provided on said housing means for connecting with the digital measuring means digital output terminal and for receiving digital data output from the digital output terminal of the digital measuring means;
   ID number setting means for storing at least one digit of desired digital data supplied from the digital measuring means through the connecting plug means as an ID number for identifying the data-transmitting apparatus;
   microcomputer means provided with said housing means, for generating a serial measured data message including both (a) the digital data supplied from the digital measuring means through the connecting plug means as a measured result of the digital measuring means, and (b) the ID number; and
   data transmitter means provided within said housing means and connected to said microcomputer means, for modulating an RF carrier signal with the serial measured data message formed in said microcomputer means to an external apparatus in the form of a radio message.

6. A data-transmitting apparatus according to claim 5 wherein said ID number setting means includes reading means for reading one of a one-digit numeral and a two-digit numeral of digital data supplied from the digital measuring apparatus through said connecting plug, and storing means for storing the numeral read by said reading means as an ID number.

7. A data-transmitting apparatus according to claim 5, wherein said data transmitter means includes switching means which is operated when digital data is output from the digital measuring apparatus, and said reading means performs the reading operating when said switching means is operated.

* * * * *